Patented Dec. 21, 1926.

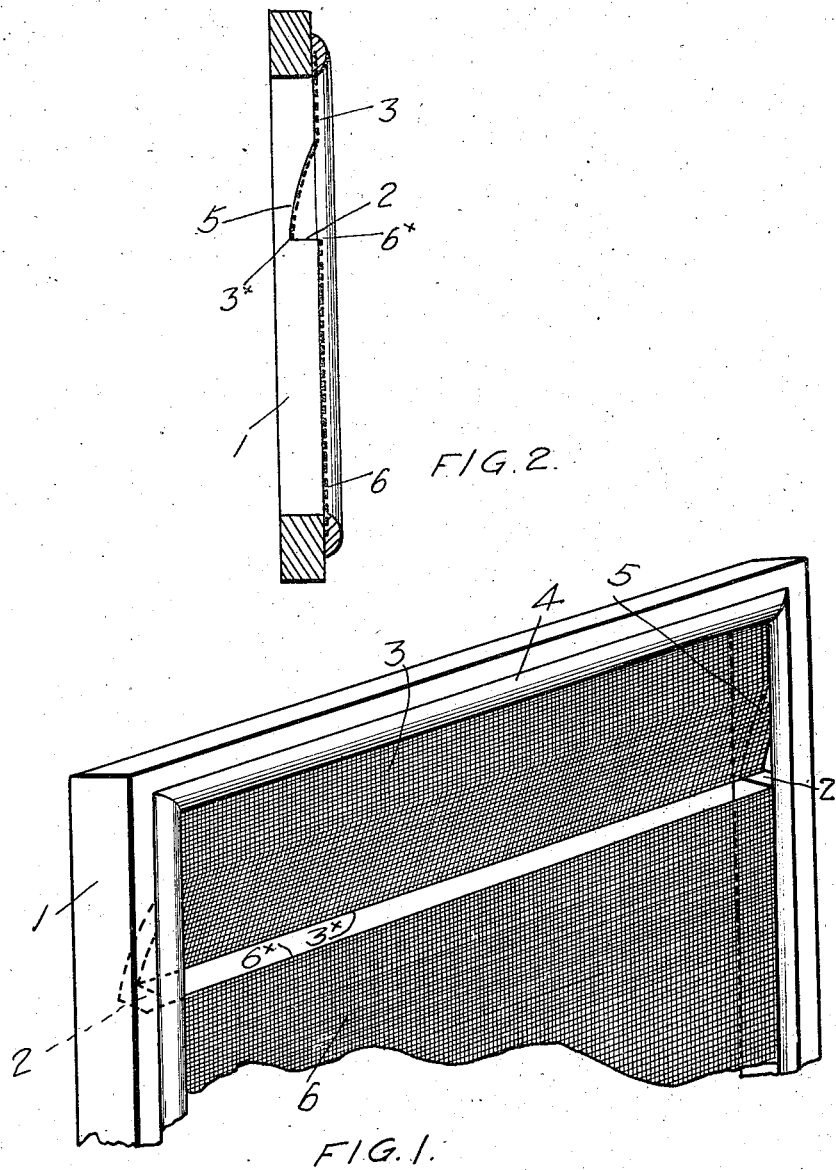

1,611,250

UNITED STATES PATENT OFFICE.

SQUIRE JAMES SMITH, OF NIAGARA FALLS, NEW YORK.

FLY SCREEN.

Application filed September 1, 1925. Serial No. 53,909.

My invention relates to improvements in fly screens, and the object of the invention is to devise simple means whereby flies attracted to the inner face of the screen will naturally and readily pass out through the screen to the outer atmosphere, and it consists essentially of a frame, an upper screen mesh portion and a lower screen mesh portion having their opposing edges extending horizontally of the frame and separated apart in horizontal alignment one to the other as hereinafter more particularly explained.

Fig. 1 is a perspective view of a portion of a fly screen showing my device incorporated therein.

Fig. 2 is a sectional view through a fly screen.

In the drawings like characters of reference indicate corresponding parts in each figure.

1 indicates a frame. 2 is a recess formed in each side member of the frame. 3 is an upper screen mesh portion which is secured to the upper portion of the frame preferably by stripping 4 and extends downward so as to enter the recess 2 and be secured along its curved edge 5.

6 is a lower screen mesh portion also secured to the frame by the stripping 4 extending upward from the bottom of the frame to the horizontal wall of the notch 2.

It will thus be seen that the upper edge 6˟ of the lower screen portion extends between the outer ends of the bottom walls of the recesses 2 and the opposing lower edge 3˟ of the upper screen portion 3 between the inner ends of the bottom wall of the notches 2 thereby separating such edges 3˟ and 6˟ horizontally apart to form an unobstructed opening through which flies attracted to the inner face of the lower screen portion 6 will readily pass through.

It is well known that flies will always pass upward through an opening, but will never pass downward, and therefore when they pass outward through the opening formed by the spaced apart screen edges 3˟ and 6˟ will never return inward through the screen into the interior of the dwelling. Also flies will not pass through a passage either upward or downward such as would be formed by the over-lapping of the screen edges 3˟ and 6˟ particularly if such passage is in the slightest degree obstructed and therefore a free opening must be provided such as applicant describes in order to permit the flies to pass outward.

From this description it will be seen that I have devised a very simple form of fly screen through which flies will readily pass from the interior of the dwelling to the outer atmosphere and thereby quickly clear such dwelling of any flies therein.

What I claim as my invention is:

A fly screen comprising a frame, vertical side bars forming triangular recesses at each side of the frame, and a mesh screen divided in a line with the base of the recesses and having the upper portion separated horizontally from the lower portion and secured to the inclined side of the recess.

SQUIRE JAMES SMITH.